Patented Apr. 15, 1947

2,418,947

UNITED STATES PATENT OFFICE 2,418,947

N[4]-(MERCAPTO-ACYL)-(p-AMINO-BENZENE-SULFONAMIDES) AND METHOD OF PREPARING SAME

William A. Lott, Maplewood, and Kathryn A. Losee, New Brunswick, N. J., and Andrew Ellis O'Keeffe, United States Army, assignors to E. R. Squibb & Sons, New York, N. Y., a corporation of New York No Drawing. Application May 17, 1943, Serial No. 488,805

10 Claims. (Cl. 260—239.6)

This invention relates to, and has for its object the provision of: [A], N[4]-(mercapto-acyl)-(p-amino-benzene-sulfonamides); [B], S-(heavy-metal) derivatives of [A]; [C], salts of [A] and [B] with bases; and [D], methods of producing [A], [B], and [C]. These compounds are promising therapeutic agents; the S-(heavy-metal) derivatives [B] and salts thereof [C] being especially promising because of their combination of the chemotherapeutic action of the sulfonamides with the therapeutic action of the heavy-metals.

The term "p-amino-benzene-sulfonamide" is used herein to designate the recognized genus composed of sulfanilamide and its N'-substitution products, such as sulfathiazole and sulfacetamide.

The invention comprises especially compounds of the formula

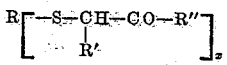

[wherein R represents a member of the class consisting of hydrogen and the heavy-metals, R' represents a member of the class consisting of hydrogen, alkyl (preferably lower alkyl), aryl (preferably phenyl), and aralkyl, R" represents the N[4] radical of a p-amino-benzene-sulfonamide, and $x$ represents the valence of R]; and salts of these compounds with bases. A representative compound of this invention, the sodium salt of the S-silver derivative of N[4]-thioglycolyl-sulfathiazole, has the structural formula

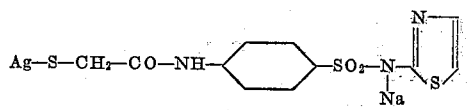

Compounds [A] may be conveniently prepared by heating a mixture of a p-amino-benzene-sulfonamide and a mercaptocarboxylic acid (preferably a thioglycolic acid, i. e., an acid of the general formula R'—CHSH—COOH, wherein R' has the meaning given hereinbefore); compounds [B] are prepared by reacting a compound [A] or an alkali-metal derivative thereof, in solution, with a soluble compound of the desired heavy-metal; and compounds [C] are prepared by reacting a compound [A] or [B] with a base, e. g., an alkali-metal (including ammonium), alkaline-earth-metal, or organic-ammonium hydroxide.

The term "heavy-metal," as employed herein, includes the heavy non-metals of metallic character, such as arsenic.

The following examples are illustrative of the invention:

EXAMPLE 1

*Preparation of N[4]-thioglycolyl-sulfanilamide*

A mixture of 17.2 g. sulfanilamide and 27.6 g. thioglycolic acid is placed in a sealed tube under nitrogen and heated at 150° C. for 3 hours. The solid, crystalline mass obtained on cooling the reaction mixture (a clear water-white liquid) is washed 3 times with water and once with alcohol, and dried in vacuo. The product, N[4]-thioglycolyl-sulfanilamide, obtained in a yield of 22 g., softens at 205° C. and melts at 215–217° C.

EXAMPLE 2

*Preparation of N[4]-thioglycolyl-sulfapyridine*

A mixture of 25 g. sulfapyridine and 27.6 g. thioglycolic acid, in a small glass capsule sealed by an open-end manometer, is heated under pressure and under nitrogen at 150° C. for 2 hours. The reaction product is washed twice with water, once with ethyl alcohol, and once with ether; and after drying for about 16 hours in vacuo, it is washed twice with ether and again dried in vacuo. The product, N[4]-thioglycolyl-sulfapyridine, is obtained in a yield of 22 g.

EXAMPLE 3

*Preparation of N[4]-thioglycolyl-sulfathiazole*

A mixture of 25.5 g. sulfathiazole and 28 g. thioglycolic acid, in a small glass capsule sealed by an open-end manometer, is heated under pressure and under nitrogen at 150° C. for 3 hours. While the reaction mixture is still warm, water is added, and the mixture, which becomes crystalline, is washed 3 times with water and twice with methyl alcohol, the separation of the material from the liquid being effected by centrifuging. On drying over $P_2O_5$ for about 16 hours and then over sulfuric acid, the product, N[4]-thioglycolyl-sulfathiazole, melts at 196° C.

EXAMPLE 4

*Preparation of an S-gold derivative of N[4]-thioglycolyl-sulfathiazole*

5 g. of N[4]-thioglycolyl-sulfathiazole is dissolved in 30.4 cc. N/1 sodium hydroxide solution, and 27 cc. bromauric acid is added. The reaction mixture is shaken (the reddish-brown precipitate formed becoming white), made acid to Congo red, and allowed to stand about 16 hours; and the precipitate formed is separated by centrifugation and dried in vacuo. The product, an S-gold derivative of N⁴-thioglycolyl-sulfathiazole, is obtained as a white powder melting at 186–192° C., in a yield of 4.5 g.

EXAMPLE 5

*Alternative preparation of an S-gold derivative of N⁴-thioglycolyl-sulfanilamide*

9.5 g. KAuBr₄ is dissolved in absolute alcohol, and SO₂ is passed into the deep-red solution until it turns a very-light yellow. The separated KBr is filtered off, and the filtrate is added to a solution of 3.9 g. N⁴-thioglycolyl-sulfanilamide in absolute alcohol; and the resulting white precipitate (an S-gold-derivative of N⁴-thioglycolyl-sulfanilamide) is separated by centrifugation, washed several times with alcohol to remove the sulfur dioxide, and dried in vacuo.

EXAMPLE 6

*Preparation of an S-cadmium derivative of N⁴-thioglycolyl-sulfathiazole*

5 g. N⁴-thioglycolyl-sulfathiazole is dissolved in 30.2 cc. N/1 sodium hydroxide solution, and 1.4 g. cadmium chloride is added, the precipitate formed being dissolved by shaking. On addition of 15.1 cc. N/1 HCl solution, a gelatinous white precipitate forms. The precipitate is removed by centrifugation, washed with water, and dried in vacuo. The product, an S-cadmium derivative of N⁴-thioglycolyl-sulfathiazole, is obtained as a white powder in a yield of 7.0 g.

EXAMPLE 7

*Preparation of an S-cadmium derivative of N⁴-thioglycolyl-sulfanilamide*

5 g. N⁴-thioglycolyl-sulfanilamide is dissolved in 20.3 cc. N/1 sodium hydroxide solution, and 1.8 g. cadmium chloride is added. The white gelatinous precipitate formed is centrifuged off, washed with water, and dried with alcohol and then in vacuo. The product, an S-cadmium derivative of N⁴-thioglycolyl-sulfanilamide, is obtained as a white powder in a yield of 6.5 g.

EXAMPLE 8

*Preparation of an S-bismuth derivative of N⁴-thioglycolyl-sulfathiazole*

A solution of 3.2 g. bismuth trichloride in glacial acetic acid is added dropwise to a solution of 3.5 g. of the sodium salt of N⁴-thioglycolyl-sulfathiazole in glacial acetic acid; and the precipitate, an S-bismuth derivative of N⁴-thioglycolyl-sulfathiazole, is filtered off and dried.

EXAMPLE 9

*Alternative preparation of S-bismuth derivatives of N⁴-thioglycolyl-sulfathiazole*

(1) 100 cc. of a 0.1 molar solution of bismuth trichloride in propylene glycol is added to 100 cc. of a 0.1 molar solution of N⁴-thioglycolyl-sulfanthiazole in 90% alcohol (the precipitate which forms redissolving almost immediately). Water is then added, and the white precipitate formed is filtered off and dried. The product is believed to have the formula O=Bi—S—CH₂—CO—(N₄-radical of sulfathiazole)

(2) 33 cc. of a 0.1 molar solution of bismuth trichloride in propylene glycol is added to 100 cc. of a 0.1 molar solution of N⁴-thioglycolyl-sulfathiazole in 90% alcohol. The white precipitate which forms is filtered off, washed with water and dried. The product is believed to have the formula Bi[—S—CH₂—CO—(N₄-radical of sulfathiazole)]₃

EXAMPLE 10

*Preparation of S-(trivalent antimony) derivatives of N⁴-thioglycolyl-sulfathiazole*

(1) 100 cc. of a 0.1 molar solution of antimony trichloride is added to 100 cc. of a 0.1 molar solution of N⁴-thioglycolyl-sulfathiazole in 90% alcohol (the precipitate formed redissolving almost immediately). Water is then added, and the immediately-formed white precipitate is filtered off and dried. The product is believed to have the formula O=Sb—S—CH₂—CO—(N₄-radical of sulfathiazole)

(2) 67 cc. of a 0.1 molar solution of antimony trichloride is added to 100 cc. of a 0.1 molar solution of N⁴-thioglycolyl-sulfathiazole in 90% alcohol (a slight precipitate forming). Water is immediately added; and the white precipitate formed is filtered off and dried. The product is believed to have the formula HO—Sb[—S—CH₂—CO—(N₄-radical of sulfathiazole)]₂

(3) 33 cc. of a 0.1 molar solution of antimony trichloride is added to 100 cc. of a 0.1 molar solution of N⁴-thioglycolyl-sulfathiazole in 90% alcohol. The white precipitate which forms immediately is filtered off, dried, redissolved in 10% sodium hydroxide solution, and reprecipitated by addition of 10% hydrochloric acid solution; and the precipitate is filtered off and dried. The product is believed to have the formula Sb[—S—CH₂—CO—(N₄-radical of sulfathiazole)]₃

EXAMPLE 11

*Preparation of S-(pentavalent antimony) derivatives of N⁴-thioglycolyl-sulfathiazole*

(1) 60 cc. of a 0.1 molar solution of antimony pentachloride is added to 100 cc. of a 0.1 molar solution of N⁴-thioglycolyl-sulfathiazole in 90% alcohol. Water is then added, and the white precipitate which forms immediately is filtered off and dried. The product is believed to have the formula O=Sb[—S—CH₂—CO—(N₄-radical of sulfathiazole)]₃

(2) 20 cc. of a 0.1 molar solution of antimony pentachloride is added to 100 cc. of a 0.1 molar solution of N⁴-thioglycolyl-sulfathiazole in 90% alcohol. The white precipitate which forms immediately is filtered off and dried. The product is believed to have the formula Sb[—S—CH₂—CO—(N₄-radical of sulfathiazole)]₅

EXAMPLE 12

*Preparation of the S-silver derivative of N⁴-thioglycolyl-sulfathiazole*

100 cc. of a 0.1 normal solution of silver nitrate is added to 100 cc. of a 0.1 molar solution of N⁴-thioglycolyl-sulfathiazole in 90% alcohol.

The S-silver derivative of $N^4$-thioglycolyl-sulfathiazole forms as a yellow precipitate, which is filtered off, dried, and purified by redissolving in 10% sodium hydroxide solution and reprecipitating by addition of 10% hydrochloric acid solution.

EXAMPLE 13

*Preparation of the sodium salt of the S-silver derivative of $N^4$-thioglycolyl-sulfathiazole*

4.35 g. of the S-silver derivative of $N^4$-thiogylcolyl-sulfathiazole described in Example 12 is dissolved in an equimolecular quantity of normal sodium hydroxide solution (10 cc.), the resulting solution having a pH of 10.5. On evaporating the solution to dryness under a high vacuum, the salt is obtained as a yellow powder which is completely water-soluble. The product is then thoroughly dried. The silver is not precipitated by addition of sodium hydroxide, sodium chloride, or potassium iodide, but is precipitated by addition of ammonium sulfide.

EXAMPLE 14

*Preparation of the sodium salt (i. e., $N'$-sodium-derivative) of $N^4$-thioglycolyl-sulfathiazole*

This salt is obtained by dissolving $N^4$-thioglycolyl-sulfathiazole (cf. Example 3) in alcohol, adding a moderate excess (over the equivalent quantity) of alcoholic sodium hydroxide, and evaporating the solution to dryness in vacuo; or an aqueous solution of the salt is obtained direct by adding the $N^4$-thioglycolyl-sulfathiazole to the requisite quantity of a dilute aqueous solution of sodium hydroxide.

The $N^4$-(mercapto-acyl)-(p-amino-benzene-sulfonamides) generally may be converted into their salts with bases in the manner detailed in Example 13.

EXAMPLE 15

*Preparation of the sodium salt of an S-gold derivative of $N^4$-thioglycolyl-sulfathiazole*

An aqueous solution of the salt is obtained direct by adding the S-gold derivative of $N^4$-thioglycolyl-sulfathiazole described in Example 4 to a molecular equivalent of sodium hydroxide in aqueous solution; and the salt itself is obtained by evaporating the solution to dryness in vacuo. This salt is surprisingly nontoxic, and enables the combination of gold therapy with sulfonamide therapy in a single, readily-absorbable drug.

The insoluble, S-(heavy-metal) derivatives of the $N^4$-(mercapto-acyl)-(p-amino-benzene-sulfonamides) generally may be solubilized by conversion into the sodium salts (or salts with other bases) in the manner detailed in Example 15.

Manifestly, a large number and variety of other $N^4$-(mercapto-acyl)-(p-amino-benzene-sulfonamides) may be obtained by the procedures of Examples 1, 2 and 3, using the appropriate mercapto-carboxylic acid (I) and p-amino-benzene-sulfonamide (II) reactants. The following additional reactants (I) and (II), inter alia, may be used for the preparation of the compounds of this invention:

(I)

β-Mercapto-propionic acid
α-Mercapto-propionic acid (thiolactic acid)
α-Mercapto-butyric acid
α-Mercapto-isobutyric acid
α-Phenyl-thioglycolic acid
Thiomalic acid
o-Mercapto-benzoic acid (II)

Sulfacetamide
Sulfadiazine
4-aminobenzenesulfon-4'-dimethylamino-anilide
2-(p-amino-benzene-sulfonamido)-$\Delta^2$-thiazoline
2-(p-amino-benzene-sulfonamido)-quinoline
2-(p-amino-benzene-sulfonamido)-4-methyl-thiazole
2-(p-amino-benzene-sulfonamido)-4-phenyl-thiazole
2-(p-amino-benzene-sulfonamido)-4,6-dimethyl-pyrimidine
2-(p-amino-benzene-sulfonamido)-pyrazine
2-(p-amino-benzene-sulfonamido)-4-methyl-pyrimidine
N-(p-amino-benzene-sulfonyl)-hydroxylamine
N-(p-amino-benzene-sulfonyl)-ethanolamine Manifestly, also, a large number and variety of other S-(heavy-metal) derivatives of $N^4$-(mercapto-acyl)-(p-amino-benzene-sulfonamides, and salts thereof, may be obtained by the procedure of Examples 4 to 12 inclusive, using the appropriate $N^4$-(mercapto-acyl)-(p-amino-benzene-sulfonamide) and heavy-metal compound (III) reactants. The following additional reactants (III), inter alia, may be used for the preparation of the S-(heavy-metal) derivatives of this invention:

Arsenous chloride
Cupric sulfate
Ferric chloride

The $N^4$-(mercapto-acyl)-(p-amino-benzene-sulfonamides) and salts thereof with bases are promising chemotherapeutic agents for various infections, and are especially valuable as intermediates for the preparation of the chemotherapeutic S-(heavy-metal) derivatives of the $N^4$-(mercapto-acyl)-p-amino-benzene-sulfonamides). These heavy-metal derivatives and salts thereof are in general readily-absorbable compounds in which the heavy-metal is bound tightly enough not to cause local toxicity and yet loosely enough to provide a therapeutically-effective supply of the metal. Agents for the treatment of infectious arthritis, gonorrhea, syphilis, kala azar, bovine mastitis, tuberculosis, and lymphogranuloma venereum, inter alia, may be obtained by converting the $N^4$-(mercapto-acyl)-(p-amino-benzene-sulfonamides) into S-(heavy-metal) derivatives of the appropriate therapeutic heavy-metal.

The invention may be variously otherwise embodied within the scope of the appended claims.

We claim:

1. A compound of the general formula

wherein R'' represents the $N^4$-radical of a p-amino-benzene-sulfonamide.

2. $N^4$-thioglycolyl-sulfathiazole, represented by the structural formula

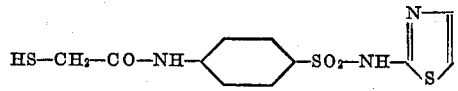

3. The method which comprises heating a mixture composed of a p-amino-benzene-sulfonamide and an acid of the general formula

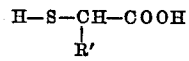

wherein R' represents a member of the class consisting of hydrogen, alkyl, aryl, and aralkyl.

4. The method which comprises heating a compound of the general formula $$H-S-R'''-CO-R''$$

wherein R'' represents the $N^4$-radical of a p-amino-benzene-sulfonamide and R'''—CO— represents an acyl radical, in solution, with a soluble compound of a heavy metal.

5. A compound of the class consisting of: [A] compounds of the general formula $$H-S-R'''-CO-R''$$

wherein R'' represents the $N^4$-radical of a p-amino-benzene-sulfonamide, and R'''—CO— represents an acyl radical; [B] heavy-metal derivatives of [A], wherein the metal is directly linked to the S in the general formula; [C] salts of [A] with bases; and [D] salts of [B] with bases.

6. A compound of the general formula $$R\left[-S-CH-CO-R'' \atop R'\right]_x$$

wherein R'' represents the $N^4$-radical of a p-amino-benzene-sulfonamide, R' represents a member of the class consisting of hydrogen, alkyl, aryl, and aralkyl, R represents a member of the class consisting of hydrogen and the heavy metals, and $x$ represents the valence of R.

7. A heavy-metal derivative of a compound of the general formula $H-S-R'''-CO-R''$, wherein R'' represents the $N^4$-radical of a p-aminobenzene-sulfonamide, R'''—CO— represents an acyl radical, and wherein the metal is directly linked to the S in the general formula.

8. A heavy-metal derivative of a compound of the general formula $H-S-CH_2-CO-R''$, wherein R'' represents the $N^4$-radical of a p-amino-benzene-sulfonamide, and the metal is directly linked to the S in the general formula.

9. A bismuth derivative of a compound of the general formula $H-S-R'''-CO-R''$, wherein R'' represents the $N^4$-radical of a p-aminobenzene-sulfonamide, R'''—CO— represents an acyl radical, and wherein the bismuth is directly linked to the S in the general formula.

10. A compound of the general formula $$Ag-S-R'''-CO-R''$$

wherein R'' represents the $N^4$-radical of a p-aminobenzene-sulfonamide, and R'''—CO— represents an acyl radical.

WILLIAM A. LOTT.
KATHRYN A. LOSEE.
ANDREW ELLIS O'KEEFFE.

REFERENCES CITED

The following references are of record in the file of this patent:

UNITED STATES PATENTS

| Number | Name | Date |
|---|---|---|
| 2,270,676 | Behnisch | Jan. 20, 1942 |
| 2,260,632 | Moore | Oct. 28, 1941 |
| 2,289,029 | Mietsch | July 7, 1942 |
| 2,300,676 | Kharasch et al. | Nov. 3, 1942 |
| 2,303,698 | Kharasch et al. | Dec. 1, 1942 |
| 2,295,867 | Roblin et al. | Sept. 15, 1942 |
| 2,324,013 | Moore | July 13, 1943 |